US011790345B2

(12) United States Patent
Singh (10) Patent No.: US 11,790,345 B2
(45) Date of Patent: Oct. 17, 2023

(54) CARD TO CARD TRANSACTION INITIATION USING LIGHT FIDELITY ("LIFI") ENABLED SMART GLASSES

(71) Applicant: Bank of America Corporation, Charlotte, NC (US)

(72) Inventor: Shailendra Singh, Thane West (IN)

(73) Assignee: Bank of America Corporation, Charlotte, NC (US)

( * ) Notice: Subject to any disclaimer, the term of this patent is extended or adjusted under 35 U.S.C. 154(b) by 118 days.

(21) Appl. No.: 17/591,697

(22) Filed: Feb. 3, 2022

(65) Prior Publication Data
US 2023/0245098 A1 Aug. 3, 2023

(51) Int. Cl.
G06Q 20/32 (2012.01)
G06Q 20/34 (2012.01)
G06V 20/20 (2022.01)
G06F 3/01 (2006.01)
G06F 3/04842 (2022.01)
G06F 3/0488 (2022.01)
G02B 27/01 (2006.01)
G06F 3/0486 (2013.01)

(52) U.S. Cl.
CPC ..... *G06Q 20/3276* (2013.01); *G02B 27/0172* (2013.01); *G06F 3/017* (2013.01); *G06F 3/0486* (2013.01); *G06F 3/0488* (2013.01); *G06F 3/04842* (2013.01); *G06Q 20/341* (2013.01); *G06V 20/20* (2022.01); *G02B 2027/014* (2013.01); *G02B 2027/0138* (2013.01); *G02B 2027/0178* (2013.01)

(58) Field of Classification Search
None
See application file for complete search history.

(56) References Cited

U.S. PATENT DOCUMENTS

| 9,876,770 | B1* | 1/2018 | Ekambaram | H04B 10/85 |
| 10,330,957 | B2* | 6/2019 | Boss | H04B 10/116 |
| 2023/0117748 | A1* | 4/2023 | Gupta | G06Q 20/321 |
| | | | | 705/44 |

FOREIGN PATENT DOCUMENTS

WO WO-2015032828 A1 * 3/2015 ......... G02B 27/0172

OTHER PUBLICATIONS

"EPROM," Wikimedia Foundation, Inc., https://en.wikipedia.org/wiki/EPROM, Jan. 2, 2022.

* cited by examiner

Primary Examiner — Paul S Schwarzenberg
(74) Attorney, Agent, or Firm — Weiss & Arons LLP (57) ABSTRACT

A smart glasses device for initiating a transaction between a first smart card and a second smart card is provided. The smart glasses device may include a camera operable to capture an image of the first smart card and of the second smart card. The smart glasses device may include a display operable to trigger an augmented reality display including a first selectable image of the first smart card and a second selectable image of the second smart card. The camera may further capture a series of motions corresponding to a numerical value inputted in an augmented fillable field, a selection of the second selectable image of the second smart card, and a movement dragging the selected second selectable image from a first location to a second location positioned on top of the first selectable image of the first smart card. The positioning automatically triggering an initiation of the transaction.

20 Claims, 5 Drawing Sheets

CARD TO CARD TRANSACTION INITIATION USING LIGHT FIDELITY ("LIFI") ENABLED SMART GLASSES

FIELD OF TECHNOLOGY

Aspects of the disclosure relate to providing apparatus and methods for use with smart glasses. In particular, the disclosure relates to apparatus and methods for using smart glasses for card-to-card transaction initiation.

BACKGROUND OF THE DISCLOSURE

Smart glasses have become more common in recent years. For the purposes of this disclosure, smart glasses may be understood to mean wearable glasses that include one or more internal processors.

Smart glasses are compact devices and usually stay with the user. Therefore, smart glasses are easily accessible.

Additionally, smart glasses include an augmented reality display that may be configured to display data captured by the smart glasses and further enable interacting with the captured data.

Because of the ease of access associated with smart glasses and the capabilities of the smart glasses, it would be desirable to leverage smart glasses for performing transactions between smart cards.

It would be further desirable for such communication to obviate the need for associated mobile devices, desktop computers, laptop computers, card devices or any other devices.

SUMMARY OF THE DISCLOSURE

A method for using smart glasses to initiate a transaction between a first smart card and a second smart card is provided. The first smart card may be associated with a first user. The first user may be the smart glasses user. The second smart card may be associated with a second user.

For the purposes of this disclosure, smart glasses may be understood to mean wearable glasses that include one or more internal processors. The one or more internal processors may include one or more microprocessors.

In addition to the processors, smart glasses may also include hardware components associated with conventional glasses. Such conventional components may include a frame and lenses.

Other components of smart glasses may include one or more displays, one or more cameras for capturing photographs and/or videos, one or more audio input devices, one or more audio output devices and/or one or more wired and/or wireless communication modules (e.g., Bluetooth®, Beacon®).

One or more software modules may execute on the processors. The one or more software modules may be stored in a memory located within the smart glasses. The one or more software modules may, in the alternative, be referred to as applications. The applications may enable the smart glasses to execute various tasks.

In addition to software modules, smart glasses may also include a display. In one embodiment, the smart glasses display may be physically configured to add data alongside what the wearer sees through the lenses. In some embodiments, the smart glasses display may display data as an at least partially transparent overlay on top the lenses. As such, the user may view, through the overlay, the physical objects that are normally seen through lenses. Such a smart glasses display may be known as an augmented reality smart glasses display.

Another component of smart glasses may include the ability for smart glasses to modify its optical properties, such as tint and prescription of the lenses. The optical properties modification may be executed at any given time. Smart glasses may change optical properties of the lenses by executing one or more software modules on the internal processors.

Smart glasses may also include one or more communication transceivers. The communication transceivers may be operable to communicate with external processors. The external processors may be included in a mobile device or any other suitable computing device.

Smart glasses may include a contactless communication module. The contactless communication module may operate on the smart glasses processor. The contactless communication module may initiate communication with another smart glasses.

In some embodiments, the contactless communication module may be an active near field communication ("NFC") reader. As such, the contactless communication module may communicate with another smart glasses using NFC technology.

In some embodiments, the contactless communication module may be via light fidelity ("Lifi") technology. Lifi is a two-way network protocol for high speed connectivity using light technology. LiFi is a light-based communication system capable of transmitting data wirelessly at high speed using light emitting diodes (LEDs).

The method may include detecting, using a smart glasses camera, the first smart card and the second smart card within a field of view ("FOV") of the smart glasses. The method may further include capturing, using the smart glasses camera, an image of the detected first smart card. The method may also include capturing, using the smart glasses camera, an image of the detected second smart card. The first smart card may be an initiator of a transaction and the second smart card may be a recipient of the transaction.

The method may further include extracting, using a microprocessor, first identification data from the first smart card. The method may also include extracting, using the microprocessor, second identification data from the second smart card. The extracting may be enabled using image classification and object detection algorithms embedded in the smart glasses.

First identification data and second identification data may include information on the first and second smart card that may be visual to a user's eye. This information may include a name of the cardholder of the smart card, a card account number, security code, expiration date and a bank routing number. The data may be cognitively extracted from the first smart card and the second smart card.

The method may include using the smart glasses to display a first augmented reality display.

The method may include capturing, using the smart glasses camera, a motion associated with a selection. The selection configured to initiate a transaction in the first augmented reality display.

The selection may be received from the smart glasses user. The selection may include a touch of a selectable option on the first augmented reality display to initiate an inter-card transfer.

Smart glasses may be operable to receive commands from a user. The commands may be received in different ways. For example, the commands may be received from the user via touch gestures to one or more dynamic or static buttons on a viewable and actionable display associated with smart glasses. The commands may also be received from the user via touch gestures to one or more portions of the frames of smart glasses. Touch gestures may include swiping, pressing, tapping and squeezing. Touch gestures may also include a pattern of any of the abovementioned gestures.

The commands may also be received from air-based hand and/or body gestures. Air-based hand and/or body gestures may be performed by the user's hand or body without specifically touching smart glasses. Various sensors, such as an accelerometer, gyroscope and touch pad may sense the hand and/or air gestures. Upon sensing the hand and/or air gestures, the sensor(s) and/or associated processors may translate the hand and/or air gestures into commands. The commands may be based on a command structure received from an external processor. The command structure may be a payment structure.

In some embodiments, the selecting for initiating the transaction may be selected by a smart glasses user on a mobile device application of a mobile device associated with the smart glasses user. In response to the selection, the method may include transmitting a communication from the mobile device to the smart glasses to initiate the transaction.

In response to the capturing the method may include retrieving, by a smart glasses Lifi receptor, a first erasable programmable read-only memory ("EPROM") array pattern. The Lifi receptor may be embedded in the smart glasses. The first EPROM array pattern may be embedded on a chip of the EPROM and may not be visible on the first smart card.

The first smart card may include a Lifi emitter embedded in the first smart card. The first EPROM array pattern may be transmitted via the Lifi emitter at the first smart card to the smart glasses.

In response to the capturing, the method may further include retrieving, by the smart glasses Lifi receptor, a second EPROM array pattern embedded on a chip of the EPROM on the second smart card. The second EPROM array pattern may be transmitted to the smart glasses by a Lifi emitter included on the second smart card.

The method may include verifying the first identification data and the first EPROM array pattern. The verifying may include establishing a connection with a payment processing network identified by a routing number on the first smart card. The verifying may further include transmitting to the payment processing network a data packet including the first identification data and the first EPROM array pattern. The verifying may also include receiving, from the payment processing network, a confirmation message confirming a veracity of the first identification data included in the data packet.

The method may also include verifying the second identification data and the second EPROM array pattern. The verifying may include establishing a connection with a payment processing network identified by a routing number on the second smart card. The verifying may further include transmitting to the payment processing network a data packet including the second identification data and the second EPROM array pattern. The method may further include receiving, from the payment processing network, a confirmation message confirming the veracity of the second identification data included in the data packet.

In some embodiments, the first identification data and/or the second identification data may not be verified. It should be appreciated that when a veracity of the data included in the data packet of the first smart card is not verified by the payment processing network, the method may include pausing the transaction. The method may also include transmitting a discrepancy communication to a smart glasses user's mobile device. The discrepancy communication may alert a smart glasses user of a discrepancy between the data packet and information stored in the payment processing network.

Following the verifying, the method may include triggering a second augmented reality display. The second augmented reality display may include a first selectable image of the first smart card, a second selectable image of the second smart card, and a fillable field.

The method may further include capturing, using the smart glasses camera, a series of motions that, within a second augmented reality, correspond to a numerical value inputted in the fillable field. The series of motions may include a selection of the first selectable image of the first smart card. The series of motions may further include a movement dragging the selected second selectable image from a first location to a second location positioned on top of the first selectable image of the first smart card.

In response to a positioning of the second selectable image of the second smart card on top of the first selectable image of the first smart card, the method may include initiating the transaction between the first smart card and the second smart card, using the microprocessor.

It should be appreciated that in some embodiments the first selectable image may be positioned on top of the second selectable image for initiating a transaction.

The initiating of the transaction may include transmitting an instruction to the payment processing network. The instruction may include an instruction to transfer a value of funds equal to the numerical value inputted in the fillable field from the first smart card to the second smart card. The instruction may further include data identifying the first smart card and data identifying the second smart card.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

A smart glasses device for initiating a transaction between a first smart card and a second smart card is provided.

For the purposes of this disclosure, a smart glasses device, referred to alternately herein as "smart glasses," may be understood to mean wearable glasses including one or more internal processors. A smart glasses device may include a plurality of hardware components. The hardware components may include a glasses frame. The glasses frame may enable the smart glasses to rest on a wearer's face. The hardware components may also include glasses lenses. The glasses lenses may correct the vision of the wearer.

The hardware components may also include a microprocessor. The microprocessor may be operable to initiate a transaction.

The hardware components may also include a display. The display may display software displays. The microprocessor may instruct the display regarding the software displays.

The hardware components may also include a battery. The battery may power the display and/or the microprocessor.

The hardware components may also include a nano wireless network interface card ("NIC"). The nano wireless NIC may establish communication with a wireless network.

The hardware components may also include an active NFC reader. The active NFC reader may detect one or more other smart glasses device within a predetermined proximity to the smart glasses device. The active NFC reader may establish communication with the one or more other smart glasses device.

The smart glasses device may also include a plurality of software components.

The plurality of software components may include a digital number pad. The digital number pad may display numerical digital software selections to the user. The digital number pad may also receive numerical input from the user.

The plurality of software components may also include an information controller module. The information controller module may capture data via the digital number pad. The captured data may include a transaction amount and/or a PIN. As such, the received numerical input may correspond to the transaction amount and/or the PIN.

In some embodiments, the smart glasses may include near-field communication ("NFC") capabilities. The smart glasses may be a near-field communication ("NFC") powered device.

The distance that may enable a communication between the smart glasses and additional devices may be within the NFC enabled communication ranges. Exemplary NFC communication ranges may be 0-1 inches, 0-1.5 inches, 0-2 inches, 0-2.5 inches, 0-3 inches, 0-3.5 inches, 0-4 inches, 0-4.5 inches, 0-5 inches, or any other suitable range supported by NFC apparatus.

The plurality of software components may also include an NFC controller module. The NFC controller module may operate as the software for the active NFC reader. As such, the NFC controller module may activate NFC communication via the NFC reader.

The NFC controller module may also send and/or receive user data, payment data and/or authentication data. As such, the NFC controller module may receive the captured data from the information controller module. The captured data may include the transaction amount and/or the PIN. The NFC controller module may transmit the captured data to a wireless controller module.

In some embodiments, the smart glasses may include light fidelity ("Lifi") capabilities. The communication between the smart glasses and one or more additional devices may be enabled via Lifi. The smart glasses may include a Lifi receptor for receiving data and a Lifi emitter for transmitting data.

The smart glasses may include a light emitting diode ("LED"). The LED may be attached to a substrate on the smart glasses. The LED may be connected to a microcontroller and/or a microprocessor. The LED may be operable to transmit data to any one or more additional computing devices including smart cards.

Lifi is a two-way network protocol for high speed connectivity using light technology. LiFi is a light-based communication system capable of transmitting data wirelessly at high speed using light emitting diodes (LEDs). The speed of LiFi transfer may enable real-time parallel processing of large-scale files, vastly improving processing efficiency. The speed of LiFi transmission may also limit data leakage and thus protect against adversarial attacks during the data transmission process.

LiFi may capture data in modulated light frequencies. The driver-circuit in LED bulbs may encode and transmit data by switching the LED on and off at rates so fast that the flickering is indiscernible to the human eye. The data may be decoded by an optical sensor on the receiving end and converted back into an electronic data stream.

In some embodiments, LED bulbs may be dimmed to levels below human visibility while still emitting enough light to carry data. The transmission speed of Lifi may enable transfers at a very fast speed.

Lifi may use the visible light spectrum which is very large and is therefore not limited by spectrum capacity.

Lifi is able to deliver consistent large data transfers. Additionally, Lifi frequencies may be used in electromagnetic sensitive areas without causing interference. Lifi infrastructure may be relatively simple and may not require the use of radio transmitters and antennaes.

The limited hardware required for Lifi communications may also improve energy efficiency.

The smart contact lens may be exposed to light, mechanical movement of blinking and electromagnetic conduction and may harvest energy from these sources.

The microprocessor embedded in the smart glasses may be operable to capture, store and transmit data.

One or more software modules may execute on the processors. The one or more software modules may be stored in a memory located within the smart glasses. The one or more software modules may, in the alternative, be referred to as applications. The applications may enable the smart glasses to execute various tasks.

The microprocessor may execute an eye movement tracking application. The eye movement tracking application may execute an eye tracker application. Sensors may be controlled by the eye tracking application executed on the smart glasses microprocessor. Eye position data detected by the sensors may be collected by the eye tracking application. Eye position data detected by the sensors may be stored in a memory embedded in the smart glasses. Sensors for tracking user eye position may include cameras. In some embodiments, the cameras may be combined with illuminators. The illuminators may include a near infrared light source or any suitable light source.

One method of tracking user eye position involves pupil center corneal reflection (PCCR). PCCR is a method for remote, non-intrusive eye tracking. A light source illuminates the eye causing visible reflections and a camera captures an image of the reflections. A vector is calculated based on the angle between the cornea and pupil reflections. The direction of the vector combined with other geometrical features of the reflections may be used to determine eye position. Eye position may include gaze direction.

In some embodiments, the smart glasses may include multiple cameras per eye for increased accuracy in measuring gaze direction. The smart glasses may include accelerometer, gyroscope and magnetometer sensors in order to provide differentiation between head and eye movements. The smart glasses may include slippage compensation and persistent calibration to enable integrating the smart contact lenses with the development platform and may enable a user to develop applications in a hands-free manner.

The smart glasses device may include a display. The display may be operable to display a first augmented reality display.

The smart glasses may include a camera. The camera may be operable to capture a motion associated with a selection to initiate a transaction in the first augmented reality display. The camera may be further operable to detect the first smart card and the second smart card within a field of view ("FOV") of the smart glasses device.

The FOV of the smart glasses device may include a solid angle through which a detector may be sensitive to electromagnetic radiation.

The smart glasses may include a battery. The battery may be operable to power the camera, the microprocessor and the display.

The camera may be further operable to capture an image of the detected first smart card and an image of the detected second smart card.

A smart card may be a physical card that has an embedded integrated chip that may perform as a security token. Smart cards are typically the same size as a driver's license or credit card. The smart card may be made out of metal or plastic. Smart cards may be enabled to connect to a reader. The connection may be direct physical contact, or through a short-range wireless connectivity standard such as radio-frequency identification (RFID) or near-field communication.

The chip on a smart card can be either a microcontroller or an embedded memory chip. Smart cards may be designed to be tamper-resistant and use encryption to provide protection for in-memory information. Cards with microcontroller chips may perform processing functions on the card and manipulate information in the chip's memory.

In some embodiments, prior to initiating the transaction, the smart glasses device may authenticate the user. The authentication may occur before, during and/or after the transaction initiation. An authorization module, included in the smart glasses device, may authenticate the user of the smart glasses. The authentication may be executed at an authorization module included in the smart glasses device. The authorization module may authenticate the user based on a group of detected user behavioral characteristics. The group of detected user behavioral characteristics may include gait, speed, voice detection, head movements and body movements. The authorization module may authenticate the user using any suitable authentication method.

The smart glasses may include a microprocessor operable to extract first identification data from the first smart card and second identification data from the second smart card.

First identification data and second identification data may include information on the first and second smart card that may be visual to a user's eye. This information may include a name of the cardholder of the smart card, a card account number, security code, expiration date and a bank routing number. The data may be extracted using image classification and object detection algorithms executed at the smart glasses.

In some embodiments, partial identification data may be detected and extracted. The detecting of the second smart card may include using image recognition to detect information presented on the second smart card. The information may include a first group of information and a second group of information. The second group of information may include a security code and/or an expiration date.

When an image of the second smart card is being captured, the capturing may include, prior to saving the image, obscuring the second group of information. Following the obscuring, an obscured version of the image of the second smart card may be stored.

In some embodiments, the second group of information may not be obscured. The capturing may include capturing only the first group of information and deleting the second group of information. The image projected on the augmented reality display may only display the first group of information.

Specifically, when a value of funds is transferred to the second smart card, an account number, phone number and/or email address may be the only identification data necessary to enable the initiating of the transfer.

When the transaction includes transferring a value of funds from the first smart card to the second smart card, some of the identification data may not be necessary. Secure data, i.e.—security code, may preferably be obscured by the smart glasses and may not be included in the image of the smart card. In some embodiments, the smart glasses may be configured not to extract the secure data.

In some embodiments the detecting of the second smart card may include using image recognition to detect information presented on the second smart card. The information may include a first group of information and a second group of information.

The capturing of the image of the detected second smart card may include storing an image of the first group of information and obscuring, in the captured image, the second group of information. The second group of information may include a security code and an expiration date.

The smart glasses may include a Lifi receptor. The Lifi receptor may be operable to retrieve a first EPROM array pattern embedded on a chip of the EPROM on the first smart card. The first EPROM array pattern may be transmitted to the smart glasses device by a Lifi emitter included on the first smart card and may be retrieved by the Lifi receptor.

The Lifi receptor may be further operable to retrieve a second EPROM array pattern embedded on a chip of the EPROM on the second smart card. The second EPROM array pattern may be transmitted to the smart glasses device by a Lifi emitter included on the second smart card.

In some embodiments, the first EPROM array pattern and/or the second EPROM array pattern may be static patterns. The patterns may not change.

In some embodiments, the first EPROM array pattern and/or the second EPROM array pattern may be dynamic patterns. The patterns may change at pre-determined intervals. The pre-determined intervals may be frequent intervals. The smart glasses may be configured to receive via an embedded subscriber identify module ("E-SIM"), at pre-determined frequent intervals, an updated first EPROM array pattern and an updated second EPROM array pattern.

The E-SIM may be embedded at the smart glasses and may enable electronically communicating with a first originating entity of the first smart card and a second originating entity of the second smart card.

The microprocessor may be operable to verify the first identification data and the first EPROM array pattern. The microprocessor may be operable to verify the second identification data and the second EPROM array pattern.

The verification of the first identification data and the first EPROM array pattern may include establishing a connection with a payment processing network identified by a routing number on the first smart card. The verification may further include transmitting to the payment processing network a data packet including the first identification data and the first EPROM array pattern. The verification may further include receiving, from the payment processing network, a confirmation message confirming a veracity of the first identification data and the first EPROM array pattern included in the data packet.

The verification of the second identification data and the second EPROM array pattern may include establishing a connection with a payment processing network identified by a routing number on the second smart card. The verification may also include transmitting to the payment processing network a data packet including the second identification data and the second EPROM array pattern. The verification may further include receiving, from the payment processing network, a confirmation message confirming a veracity of the second identification data and the second EPROM array pattern included in the data packet.

In some embodiments, when the veracity of the data included in the data packet of the first smart card is not confirmed by the payment processing network, the smart glasses may be configured to execute a query to determine if the first smart card requires activation.

When it is determined that the first smart card requires activation, the first smart card may be enabled to be activated via the smart glasses.

The smart glasses may be configured to receive from a mobile application a token and/or a password. In some embodiments, the smart glasses may be configured to receive a one-time password ("OTP"). The smart glasses may be in electronic communication with the mobile application.

In response to the receipt of the OTP, the display may be configured to trigger a third augmented reality display. The third augmented reality display may include the OTP. The OTP may be inputted into a mobile application user interface at a mobile device via the smart glasses user.

The mobile application may be configured to confirm the OTP. In response to the confirming, the mobile application may be configured to active the first smart card.

Once the first smart card is activated, the microprocessor may be configured to update smart glasses user data stored in a database at the smart glasses to include card identification data of the first smart card.

When the veracity of the data included in the data packet of the first smart card is verified, the display of the smart glasses may be further operable to trigger a second augmented reality display. The second augmented reality display may include a first selectable image of the first smart card, a second selectable image of the second smart card, and a fillable field.

The camera may be operable to capture a series of motions within a second augmented reality. The series of motions within the second augmented reality may correspond to a numerical value inputted in the fillable field. The series of motions may further correspond to a selection of the first selectable image of the first smart card. The series of motions may further correspond to a movement dragging the selected second selectable image from a first location to a second location positioned on top of the first selectable image of first second smart card.

The microprocessor may be operable to, in response to the positioning of the second selectable image of the second smart card on top of the first selectable image of the first smart card, initiate the transaction between the first smart card and the second smart card.

The initiating of the transaction may include transmitting an instruction to the payment processing network to transfer a value of funds equal to the numerical value inputted in the fillable field from the first smart card to the second smart card. The instruction may further include data identifying the first smart card and data identifying the second smart card.

In some embodiments a method for using smart glasses for providing an identity transfer between a first smart card and a second smart card is provided.

The method may include, using the smart glasses, displaying a first augmented reality display. The method may further include capturing, using a smart glasses camera, a motion associated with a selection to initiate an identity transfer in the first augmented reality display.

The method may further include detecting, using the smart glasses camera, the first smart card and the second smart card within an FOV of the smart glasses.

The method may further include capturing, using the smart glasses camera, an image of the detected first smart card and an image of the detected second smart card.

The method may further include extracting, using a microprocessor, first identification data from the first smart card and second identification data from the second smart card.

The method may further include retrieving, by a smart glasses Lifi receptor, a first EPROM array pattern embedded in an EPROM on the first smart card. The first EPROM array pattern may be transmitted to the smart glasses by a Lifi emitter included on the first smart card.

The method may further include retrieving, by the smart glasses Lifi receptor, a second EPROM array pattern embedded in an EPROM on the second smart card. The second EPROM array pattern may be transmitted to the smart glasses by a Lifi emitter included on the second smart card.

The method may further include verifying the first identification data and the first EPROM array pattern by establishing a connection with a payment processing network identified by a routing number on the first smart card. The verifying may further include transmitting to the payment processing network a data packet including the first identification data and the first EPROM array pattern. The verifying may also include receiving, from the payment processing network, a confirmation message confirming a veracity of the first identification data included in the data packet.

The method may also include verifying the second identification data and the second EPROM array pattern by establishing a connection with a payment processing network identified by a routing number on the second smart card. The method may further include transmitting to the payment processing network a data packet including the second identification data and the second EPROM array pattern.

The method may further include receiving, from the payment processing network, a confirmation message confirming the veracity of the second identification data included in the data packet.

In response to the confirming, the method may include triggering a second augmented reality display. The second augmented reality display may include a first selectable image of the first smart card, a second selectable image of the second smart card, and a fillable field.

The method may further include capturing, using the smart glasses camera, a series of motions. The series of motions, within a second augmented reality, may correspond to a selection of the first selectable image of the first smart card. The series of motions may also include a movement dragging the selected second selectable image from a first location to a second location positioned on top of the first selectable image of the first smart card.

In response to the positioning of the second selectable image of the second smart card on top of the first selectable image of the first smart card, the method may include automatically overwriting by the microprocessor, temporarily, second identification data at the second smart card with first identification data. The overwriting may include transmitting an instruction to the payment processing network to temporarily overwrite, in real-time, second identification data at the second smart card with first identification data.

Data that identifies a smart card may be reconfigurable. The data identification that identifies the smart card may be altered, deleted and/or replaced. This enables a smart card to alter between two or more identities. Overwriting data at the second smart card may enable a temporary lending of the first smart card to a second smart card user.

The method may further include scheduling a reset date to the second smart card on which to delete first identification data and reset the second smart card with second identification data.

The overwriting may further include overwriting the second EPROM array pattern with the first EPROM array pattern.

The overwriting may further include the overwriting, transmitting an alert message confirming the overwriting to a mobile device of a second user, the second user being the cardholder of the second smart card.

The reset date may be a pre-determined date and time for resetting the second smart card to execute transactions using a default identification. The default identification may be the second identification data.

By overwriting the second identification data with first identification data, this may enable the first smart glasses user to 'lend' the first smart card to the second smart card user.

The method may further include, when the second smart card includes first identification data, tagging to the second smart card a maximum value of funds available for use up until the reset date. The funds available for use may be determined by a smart card user of the first smart card.

For example, a smart glasses user may 'lend' the first smart card to the second smart card user. The smart glasses user may lend the first smart card to the second smart card for a pre-determined amount of time. The pre-determined amount of time may be set for a specific date and time of day. The pre-determined amount of time may be for a day, week, month or any other suitable amount of time. The smart glasses user may also preferably set a maximum amount of money to be available for spending on the card.

In some embodiments, prior to overwriting, authentication may be performed to verify the overwriting of first identification data at the second smart card. The authentication may include transmitting an electronic communication to the first smart card user requesting a response of verification. The electronic communication may be transmitted to the mobile application at the first smart card user's mobile device.

Illustrative embodiments of apparatus and methods in accordance with the principles of the invention will now be described with reference to the accompanying drawings, which form a part hereof. It is to be understood that other embodiments may be utilized, and structural, functional and procedural modifications may be made without departing from the scope and spirit of the present invention.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

Apparatus and methods described herein are illustrative. Apparatus and methods of the invention may involve some or all of the features of the illustrative apparatus and/or some or all of the steps of the illustrative methods. The steps of the methods may be performed in an order other than the order shown or described herein. Some embodiments may omit steps shown or described in connection with the illustrative methods. Some embodiments may include steps that are not shown or described in connection with the illustrative methods, but rather shown or described in a different portion of the specification.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Smart glasses 102, smart glasses 204, smart glasses 304, smart glasses 402, smart glasses 524 may have one or more features in common with the smart glasses described herein. Additionally, features of smart contact lens described in connection with FIGS. 1-5 may be included in the smart glasses described herein.

Figure 1:
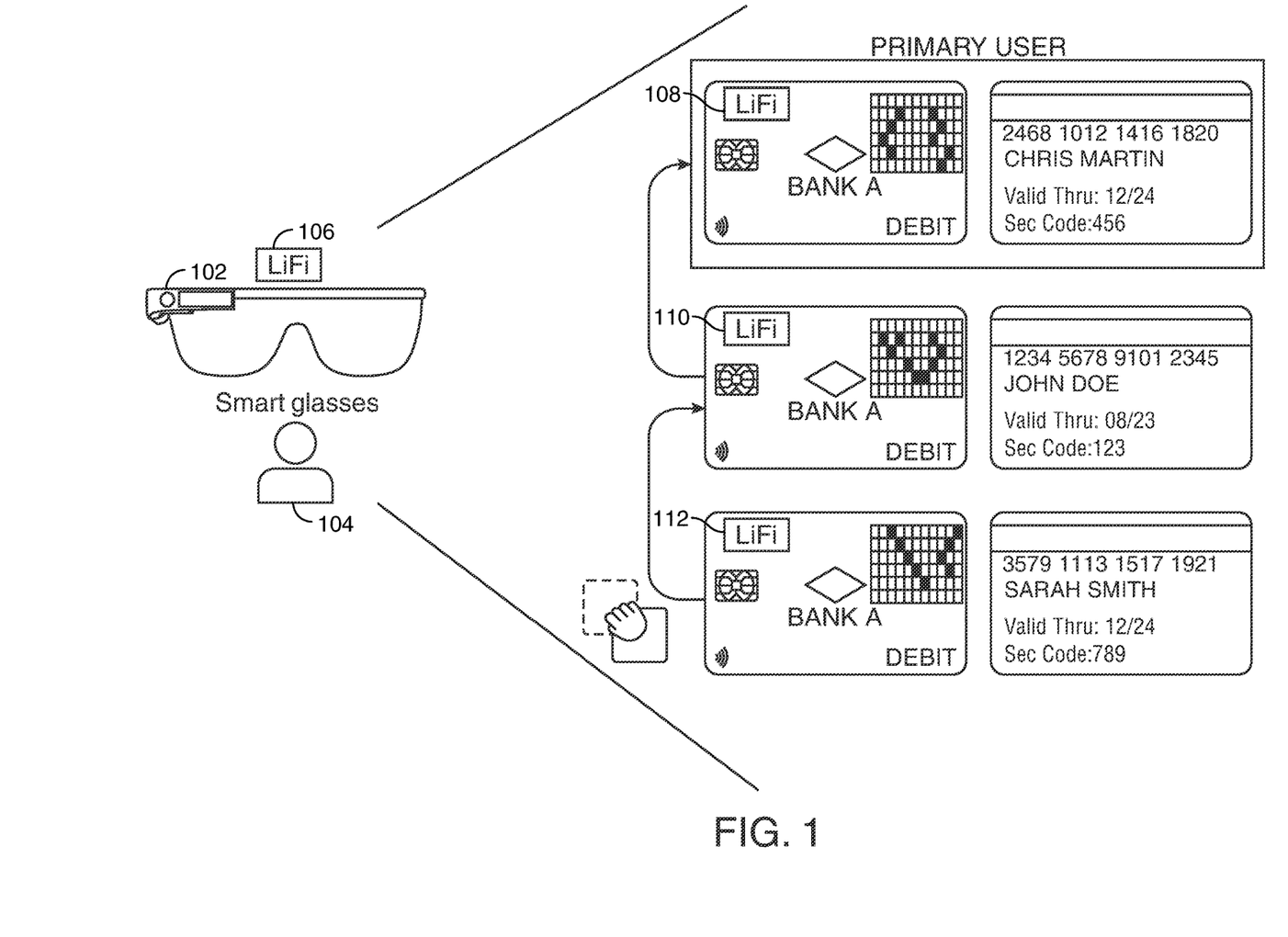
FIG. 1 shows an illustrative system architecture in accordance with principles of the disclosure.

FIG. 1 shows an illustrative system architecture in accordance with principles of this disclosure.

In FIG. 1, a smart glasses user 104 may be wearing smart glasses 102. Smart glasses 102 may include a microprocessor, a camera, one or more additional sensors and a battery. Smart glasses 102 may also include Lifi capabilities. Smart glasses 102 may include a Lifi receptor configured to enable receipt of data from a Lifi emitter at an additional mobile device.

Smart cards 108, 110 and 112 may be within visibility to smart glasses user 104. Smart cards 108, 110 and 112 may be within a FOV of smart glasses user 104. Smart card 108 may be associated with smart card user 104. Smart card 108 may be the primary card. Smart card 110 may be associated with a second smart card user. Smart card 112 may be associated with a third smart card user.

When each of smart cards 108, 110 and 112 are within the FOV of smart glasses 102, smart glasses 102 may capture identification data of each of the smart cards. Identification data on each of the smart cards may be captured via image classification and object detection. Image classification algorithms and object detection algorithms may be executed on smart glasses 102 or on a remote server.

Smart glasses 102 may include a display. The display may be a nano LED touch screen display. Smart glasses 102 may include a scanning device, such as a camera. The camera may capture a photograph of payment card 108. The camera may be actuated by receiving an instruction from user 104. The camera may capture a photograph of the face and/or the back of the payment card. The camera may capture a short video clip of the payment card.

In order to initiate a transaction, smart glasses user 104 may initiate the capture of a photograph of the payment card.

As such, smart glasses 102 may operate as a card reader. The captured photograph may be displayed on the display included in the smart glasses. The captured photograph may be visible to user 104. The captured photograph may not be visible to others in the vicinity.

The camera may capture one or more photographs of multiple payment cards 108, 110 and 112. The camera may be actuated by receiving an instruction from smart glasses user 104.

In some embodiments, the smart glasses camera may photograph each individual card separately. The smart glasses may execute a software application to aggregate the individually captured photographs into a single displayable screen. The smart glasses may display the single displayable screen. In certain embodiments, the camera may capture one photograph of multiple payment cards.

Smart glasses user 104 may capture the photograph of the payment cards in order to utilize the payment cards to generate a transaction.

When second smart card 110 is positioned on top of first smart card 108, funds may be transferred from an account associated with first smart card 108 to second smart card 110. It should be appreciated that when a third smart card 112 is positioned on top of second smart card 110 which is positioned on top of first smart card 108, the value of funds may be transferred to both the second smart card and the third smart cards.

The value of funds transferred may be inputted at the augmented reality display by the smart glasses user.

It should be appreciated that in some embodiments, when positioning second smart card 110 on top of first smart card 108, the positioning may trigger an identity switch to second smart card 110. Identification data of the first smart card 108 may be transmitted to the second smart card 110 and may overwrite the identification data at second smart card 110. This may be performed when smart glasses user 104 may wish to lend smart card 108 to the cardholder of smart card 110.

The smart glasses and the remote server may comprise one or more computer systems and servers that include one or more of the following hardware components: I/O circuitry, which may include a transmitter device and a receiver device and may interface with fiber optic cable, coaxial cable, telephone lines, wireless devices, physical network layer hardware, a keypad/display control device or any other suitable encoded media or devices; peripheral devices, which may include counter timers, real-time timers, power-on reset generators or any other suitable peripheral devices; a logical processing device, which may compute data structural information, structural parameters of the data, quantify indices; and machine-readable memory. The source database may be part of a computer system. The target database may be part of a computer system.

The smart glasses and the remote server may include RAM, ROM, an input/output ("I/O") module and a non-transitory or non-volatile memory. Machine-readable memory may store information in machine-readable data structures. The I/O module may include a microphone, button and/or touch screen which may accept user-provided input. The I/O module may include one or more of a speaker for providing audio output and a video display for providing textual, audiovisual and/or graphical output.

Software applications executed by the smart glasses and the remote server may be stored within the non-transitory memory and/or other storage medium. Software applications may provide instructions to the processor that enable the apparatus to perform various functions. The instructions may include any of the AI methods and processes described herein. For example, the non-transitory memory may store software applications such as object detection algorithms and prediction models. Alternatively, some or all of computer executable instructions of a software application may be embodied in hardware or firmware components of a computer system or server.

Software applications may include computer executable instructions for invoking user functionality related to communication, such as email, short message service ("SMS"), and voice input and speech recognition applications. Software application programs may utilize one or more algorithms that process received executable instructions, perform power management routines or other suitable tasks.

Software applications may utilize computer-executable instructions, such as program modules, executed by a processor. Generally, program modules include routines, programs, objects, components, data structures, etc. that perform particular tasks or implement particular abstract data types. A computing system may be operational with distributed computing environments where tasks are performed by remote processing devices that are linked through a communications network. In a distributed computing environment, program modules may be located in both local and remote computer storage media including memory storage devices. Computing systems may rely on a network of remote servers hosted on the Internet to store, manage, and process data (e.g., "cloud computing" and/or "fog computing").

The smart glasses and the remote server may be part of two or more networks. The smart glasses and the remote server may support establishing network connections to one or more remote computing systems. Illustrative network connections may include a local area network ("LAN") and a wide area network ("WAN"). When used in a LAN networking environment, a computing system may be connected to the LAN through a network interface or adapter. A computing system may include a communication circuit. The communication circuit may include a network interface card or adapter.

When used in a WAN networking environment, the smart glasses and the remote server may include a modem, antenna or other circuitry for establishing communications over a WAN, such as the Internet. The communication circuit may include a modem and/or antenna.

The existence of any of various well-known protocols such as TCP/IP, Ethernet, FTP, HTTP and the like is presumed, and a computing system may be operated in a client-server configuration to permit a user to retrieve web pages from a web-based server. Web browsers can be used to display and manipulate data on web pages.

Computer systems and servers may include components, such as a display, battery, speaker, and antennas. Components of a computer system and server may be linked by a system bus, wirelessly or by other suitable interconnections. Components of a computer system and server may be present on one or more circuit boards. In some embodiments, the components may be integrated into a single chip. The chip may be silicon-based.

Figure 2:
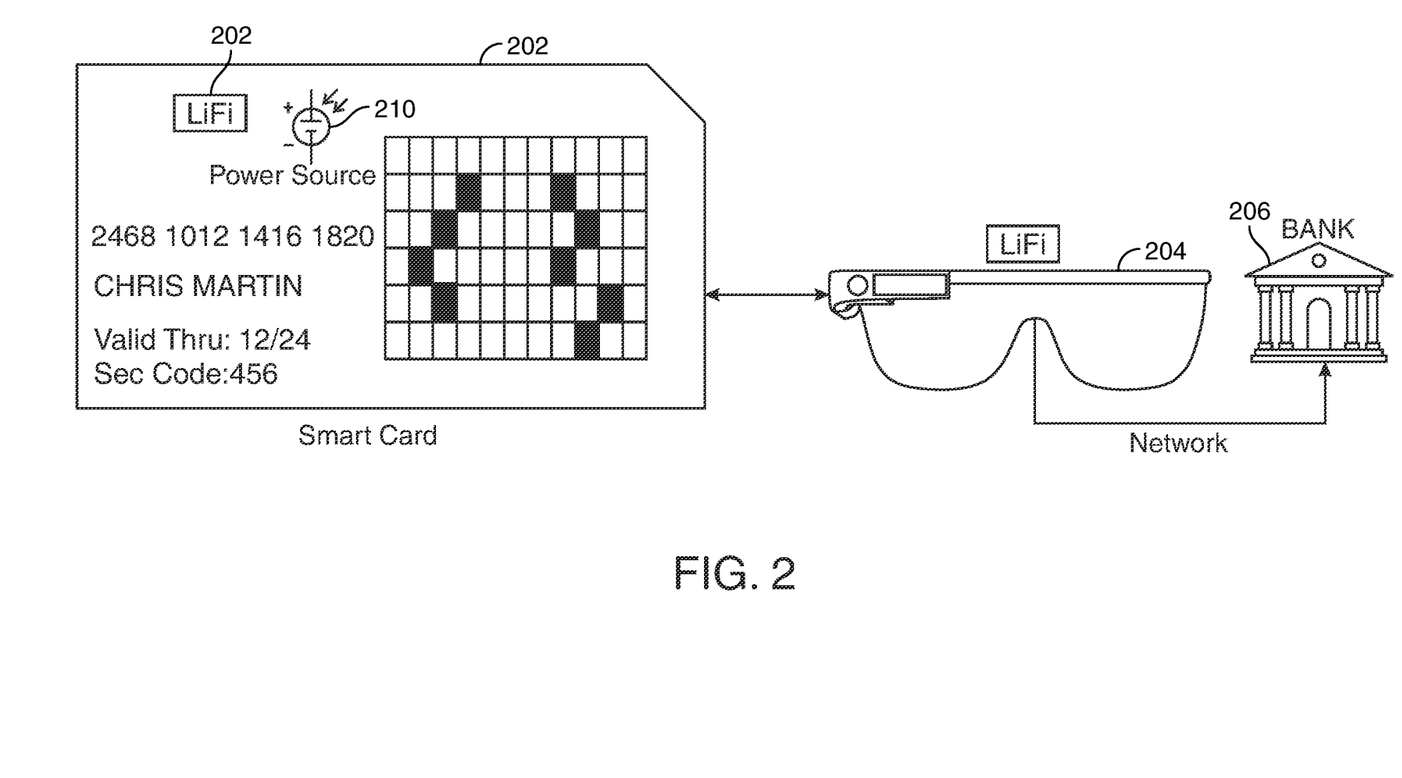
FIG. 2 shows an illustrative diagram in accordance with principles of the disclosure.

FIG. 2 shows illustrative architecture of a smart card 202 and a smart glasses 204 in accordance with principles of the disclosure. In some embodiments, smart glasses user 104 may be the cardholder of smart card 202.

Identification data at smart card 202 may include a card number, a username, a security code, an expiration data, a transaction processing network, and/or any other suitable data typically included on a face of a card. In some embodiments, the smart glasses may preferably obscure some of the identification data at smart card 202.

Smart card 202 may also include a power source 210. Power source 210 may power smart card 202. Lifi technology may also be embedded on smart card 202. Lifi technology may include a Lifi emitter and a Lifi receptor. Lifi technology may also include an LED. Data may be transmitted by the Lifi receptor using the LED. Data may be received by the Lifi receptor using the LED.

Smart card 202 may also include an EPROM array pattern 206. The EPROM array pattern may be embedded on a chip of the EPROM and may not be visible to the user.

Smart card 202 may also include an E-SIM. The E-SIM may enable receipt of a dynamic EPROM array pattern. The E-SIM may enable electronic communication with the payment processing network 206. The E-SIM may be operable to receive each generated EPROM array pattern.

Smart card 202 may be within the FOV of smart glasses 204. Smart glasses 204 may enabled to extract data from smart card 202 using the microprocessor embedded on smart glasses 204. The microprocessor may execute machine learning ("ML") algorithms to cognitively capture and extract the identification data on smart card 202.

Smart glasses 204 may be in electronic communication with a payment processing network 206 associated with smart card 202. Identification data captured at smart card 202 may be transmitted to payment processing network 206 for authentication.

Figure 3:
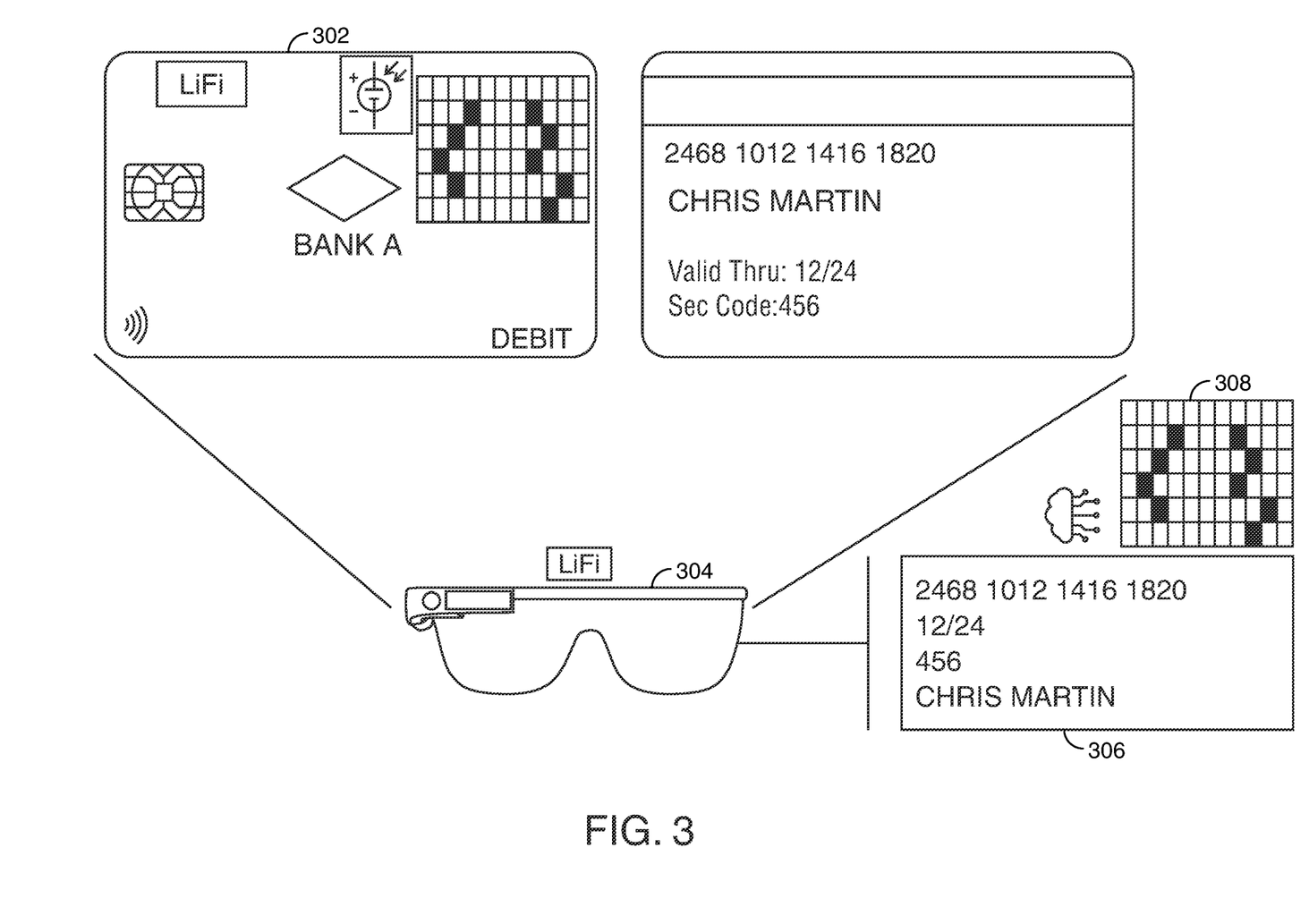
FIG. 3 shows an illustrative diagram in accordance with principles of the disclosure.

FIG. 3 shows an exemplary diagram of an image of smart card 302 augmented on augmented reality display of smart glasses 304.

Smart glasses 304 may use cognitive capabilities executed at smart glasses 304 to capture and identify identification data at smart card 302. The cognitive capabilities may include using image detection and image classification artificial intelligence ("AI") and ML algorithms or any other suitable algorithms.

The smart glasses processor may execute a software application that runs one or more algorithms to identify and retrieve card data identification elements from the card. The card data identification elements may be shown at 306 and 308. Card data identification elements at 306 may include a card number, an expiration date, a security code and a name of the cardholder. Card data identification element 308 may include the EPROM array pattern. The card data identification elements may include a card number, a card holder name, an expiration date and a card verification value ("CVV") code. These card data elements may also include identification of an external entity, such as a financial institution, associated with the card. These card data elements may include any other suitable card data elements.

The smart glasses may execute an object detection algorithm. The object detection algorithm may be a Self-Attention Generative Adversarial Network ("SA GAN"). The object detection algorithm may detect objects. When the smart contact lens user is in the process of purchasing products, the object detection algorithm may detect data having relevance to executing a transaction. Additionally, the object detection algorithm is configured for detecting objects within the confines of a defined bounded area and may discard objects outside the bounded area. The defined bounded area may be an area of the standard size of a smart card.

Figure 4:
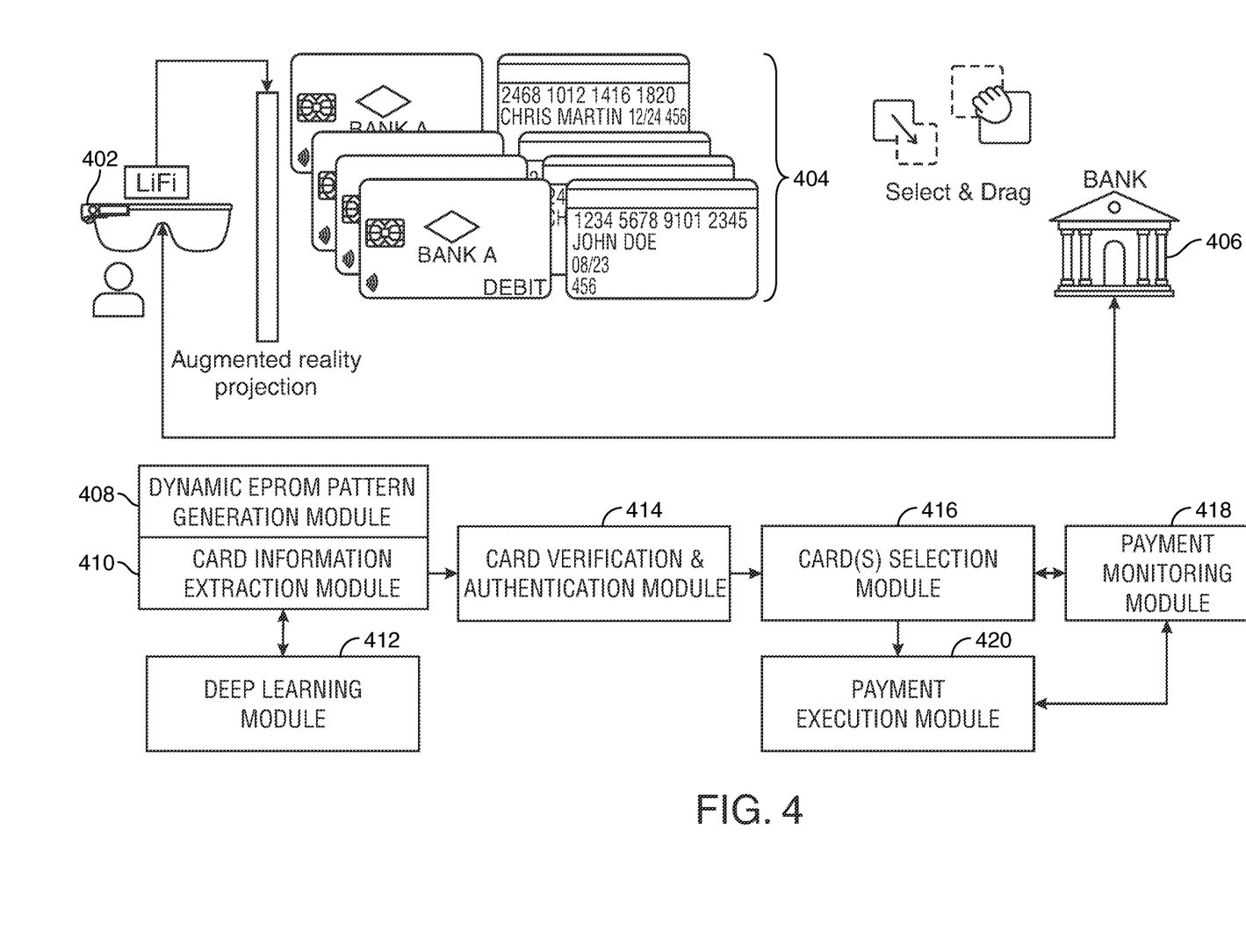
FIG. 4 shows illustrative flow diagram in accordance with principles of the disclosure.

FIG. 4 shows an exemplary diagram of a plurality of smart cards 404 on an augmented reality display and using the smart glasses 402 to perform a transaction.

Smart cards 404 may be images of smart cards and may be displayed on the augmented reality display of smart glasses 402.

Each smart card may include an EPROM array pattern embedded on the card. The EPROM array pattern may be static. The EPROM array pattern may be dynamic.

Modules 408, 410, 412, 414, 416, 418 and 420 may be applications running on smart glasses 402. The modules may be applications running on a remote server and in communication with smart glasses 402.

Each smart card may or may not include an embedded EPROM array pattern. The EPROM array pattern may be static. When the EPROM array pattern is a static pattern, the static pattern may be embedded on a chip of the EPROM.

In some embodiments, the EPROM array pattern may be a dynamic pattern. When EPROM array pattern is a dynamic pattern, dynamic EPROM pattern generation module 408 may be operable to dynamically generate a new EPROM pattern at pre-determined intervals. The pre-determined intervals may be every minute. The pre-determined interval may be each time the smart card is placed within the FOV of smart glasses 402.

Card information extraction module 410 may be executed by the microprocessor. Card information extraction module 410 may be an application operable to use a deep learning module 412 to capture and identify card identification data at each of smart cards 404. Card information extraction module 410 may be trained to identify information included on each smart card that is needed to enable a transaction between a first smart card and a second smart card. For example, card information extraction module 410 may be trained to recognize a debit/credit card based on training data of debit and credit cards.

Card information extraction module 410 may also be trained to recognize data included on the card, in addition to identifying what type of data has been recognized. For example, card information extraction module 410 may be trained to recognize a card number, a username, a security code, an expiration data, a transaction processing network, and/or any other suitable data typically included on a face of a card.

Card information extraction module 410 may also be trained to associate the recognized data with the expected data type—e.g., a recognized sequential number longer than 10 digits, with the 10 digits spaced less than a certain amount of mm apart, will be categorized as a credit card number. As such, card information extraction module may recognize and/or classify needed card data to support the card-to-card transactions described herein.

Card verification and authentication module 414 may be an application operable to transmit identification data captured to a payment processing network 406 for authentication.

Card(s) selection module 416 may be operable to capture the selection of a card and the position of the card after the card is positioned on top of one or more additional smart cards.

Payment monitoring module 418 may be operable to monitor the payment. Payment execution module 420 may be operable to transmit, card identification of each of the smart cards and a value of funds to be transferred, to a payment processing network 406 for processing the transaction.

In this exemplary diagram, multiple cards may be selected and dragged one on top of the other. A transaction of a transfer of a value of funds may automatically be transferred from the primary card to each of the multiple cards upon completion of dragging each card, as shown at 404.

It should be appreciated that smart glasses 402 may securely save portions of the identification data of each smart card for subsequent transactions. By securely saving portions of the identification data, the smart cards may not need to be present within the FOV of smart glasses 402 for a subsequent transaction.

Figure 5:
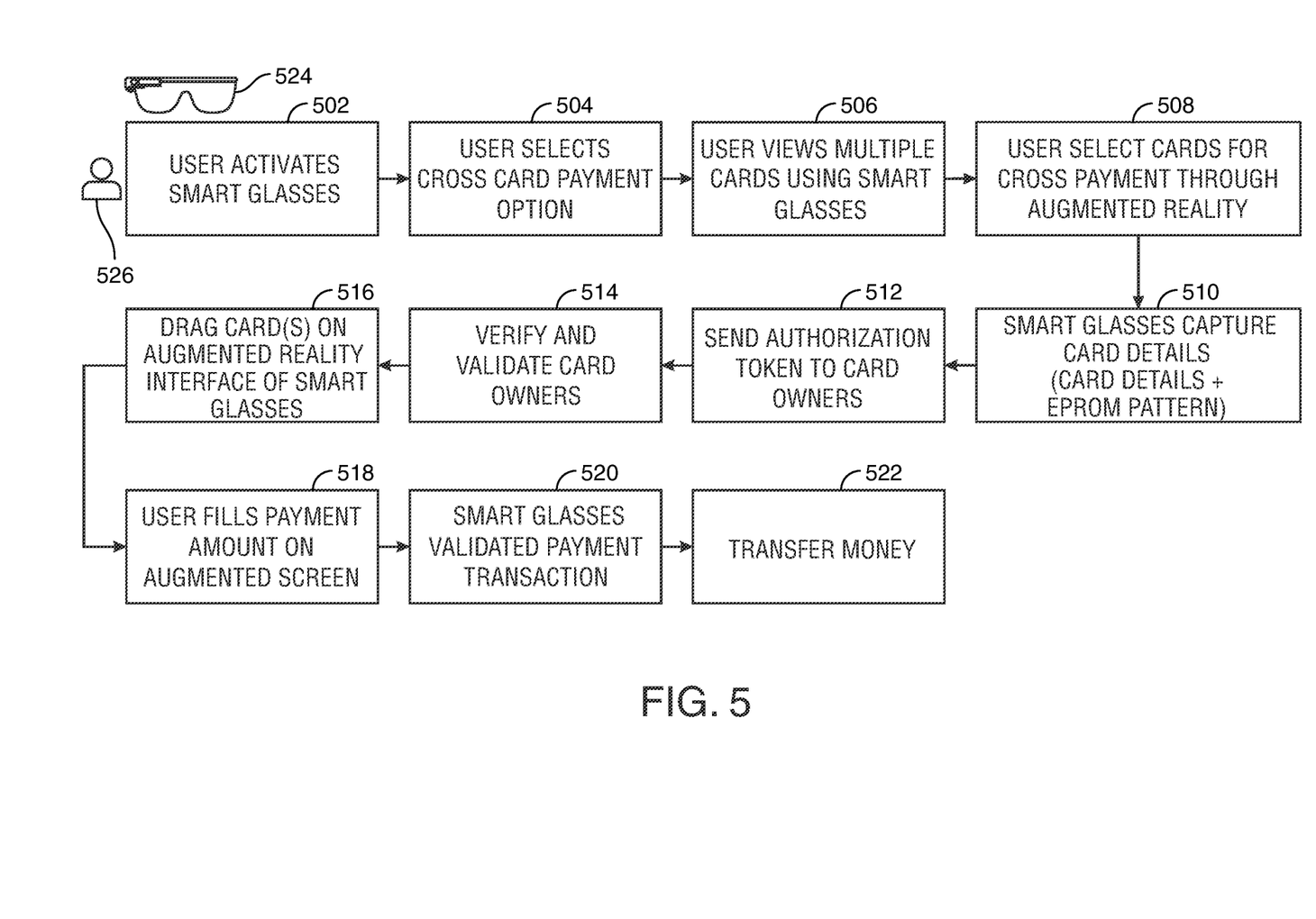
FIG. 5 shows an illustrative flow chart in accordance with principles of the disclosure.

FIG. 5 shows an illustrative flowchart of the steps for initiating a transaction using smart glasses 524 of smart glasses user 526.

At step 502, smart glasses user 526 may activate smart glasses 524. Smart glasses may be activated by a user gesture. Smart glasses may be activated by a selection of a selectable option at an augmented reality display of smart glasses 524. Smart glasses may be activated via a mobile device of user 526.

Following activation, smart glasses user 526 may select a selectable option for initiating a transaction. The transaction may be a cross card payment option displayed on an augmented reality display, as shown at 504. The cross card payment option may be for transferring a payment from one smart card to a second smart card. The transfer may be from a first smart card to a plurality of smart cards.

At step 506, smart glasses user 526 may view one, two, three or more cards using the smart glasses 524. Smart glasses 524 may be enabled to view cards that are within the FOV of smart glasses 524. Smart glasses camera may capture an image of each smart card. Each smart card image may be viewed within the augmented reality display. Each smart card image may be a selectable image.

At step 508, smart glasses user 526 may select the selectable image of each smart card that may be included in the transaction. The transaction may include a primary card initiating a transfer of funds and at least one additional smart card for receiving the transfer of funds.

At step 510, smart glasses 524 may capture card details from each smart card. The card details may include card identification data and an EPROM array pattern embedded on each card. The card identification data may be retrieved using one or more AI and ML algorithms executed by the microprocessor at smart glasses 524. The EPROM array pattern may be retrieved via Lifi.

At step 512, each card may be verified by sending an authorization token to the card owner/holder of each card. At step 514, smart glasses 524 may receive verification from each smart card.

At step 516, one or more smart cards may be selected and dragged on top of the primary smart card on an augmented reality display/interface of smart glasses 526.

At step 518, smart glasses user 526 may input a payment amount on the augmented reality screen. The payment amount may include a value of funds to be transferred to the one or more smart cards.

At step 520, smart glasses 524 may, via the microprocessor, validate the payment transaction and at step 522. The validating may include prompting the user for validation of a completion of the transaction. The user may be prompted at the augmented reality display. The user may be enabled to validate using a hand gesture, selection of a button on the keypad of the smart glasses and/or any other suitable method.

In response to a receipt of a validation for the user, smart glasses 524 may transmit an instruction to the payment processing network to transfer the value of funds to the one or more smart cards.

Thus, systems and methods for card-to-card transaction initiation using Lifi enabled smart glasses is provided. Persons skilled in the art will appreciate that the present invention can be practiced by other than the described embodiments, which are presented for purposes of illustration rather than of limitation.

What is claimed is:

1. A method for using smart glasses to initiate a transaction between a first smart card and a second smart card, the method comprising:
    detecting, using a smart glasses camera, the first smart card and the second smart card within a field of view ("FOV") of the smart glasses;
    capturing, using the smart glasses camera, an image of the detected first smart card and an image of the detected second smart card;
    extracting, using a microprocessor, first identification data from the first smart card and second identification data from the second smart card;
    using the smart glasses, displaying a first augmented reality display;
    capturing, using a smart glasses camera, a motion associated with a selection, the selection configured to initiate a transaction in the first augmented reality display;
    in response to the capturing, retrieving, by a smart glasses light fidelity ("Lifi") receptor:
        a first erasable programmable read-only memory ("EPROM") array pattern embedded in an EPROM on the first smart card, the first EPROM array pattern transmitted to the smart glasses by a Lifi emitter included on the first smart card; and
        a second EPROM array pattern embedded in an EPROM on the second smart card, the second EPROM array pattern transmitted to the smart glasses by a Lifi emitter included on the second smart card;
    verifying the first identification data and the first EPROM array pattern by:
        establishing a connection with a payment processing network identified by a routing number on the first smart card;
        transmitting to the payment processing network a data packet including the first identification data and the first EPROM array pattern; and
        receiving, from the payment processing network, a confirmation message confirming a veracity of the first identification data included in the data packet;
    verifying the second identification data and the second EPROM array pattern by:
        establishing a connection with a payment processing network identified by a routing number on the second smart card;
        transmitting to the payment processing network a data packet including the second identification data and the second EPROM array pattern; and
        receiving, from the payment processing network, a confirmation message confirming the veracity of the second identification data included in the data packet;
    triggering a second augmented reality display, the second augmented reality display including a first selectable image of the first smart card, a second selectable image of the second smart card, and a fillable field;
    capturing, using the smart glasses camera, a series of motions that, within a second augmented reality, correspond to:

a numerical value inputted in the fillable field;
a selection of the second selectable image of the second smart card; and
a movement dragging the selected second selectable image from a first location to a second location positioned on top of the first selectable image of the first smart card; and
in response to a positioning of the second selectable image of the second smart card on top of the first selectable image of the first smart card, initiating the transaction between the first smart card and the second smart card, using the microprocessor, wherein:
the initiating the transaction includes transmitting an instruction to the payment processing network to transfer a value of funds equal to the numerical value inputted in the fillable field from the first smart card to the second smart card, the instruction further comprising data identifying the first smart card and data identifying the second smart card.

2. The method of claim 1 wherein the first smart card is an initiator of a transaction and the second smart card is a recipient of the transaction.

3. The method of claim 1 wherein the selection to initiate the transaction comprises a touch of a selectable option on the first augmented reality display to initiate an inter-card transfer.

4. The method of claim 1 wherein the selection for initiating the transaction is selected by a smart glasses user on a mobile device application of a mobile device associated with the smart glasses user and in response to the selection, transmitting a communication from the mobile device to the smart glasses to initiate the transaction.

5. The method of claim 1 wherein when a veracity of the data included in the data packet of the first smart card is not confirmed by the payment processing network, the method comprises pausing the transaction and transmitting a discrepancy communication to a smart glasses user's mobile device, the discrepancy communication alerting a smart glasses user of a discrepancy between the data packet and information stored in the payment processing network.

6. The method of claim 1 wherein when the veracity of the data included in the data packet of the first smart card is not confirmed by the payment processing network, the method comprises executing a query, using the microprocessor, to determine if the first smart card requires activation.

7. The method of claim 6 wherein it is determined that the first smart card requires activation, the method comprises activating the first smart card, the activating comprising:
receiving at the smart glasses, from a mobile application, a one-time password ("OTP");
triggering a third augmented reality display, the third augmented reality display including the OTP;
inputting the OTP into a mobile application user interface at a mobile device;
confirming, by the mobile application, the OTP;
in response to the confirming, activating, by the mobile application, the first smart card; and
updating, by the microprocessor, smart glasses user data stored in a database at the smart glasses to include card identification data of the first smart card.

8. The method of claim 1 wherein the detecting of the second smart card includes using image recognition to detect information presented on the second smart card, the information including a first group of information and a second group of information.

9. The method of claim 8 wherein the capturing of the image of the detected second smart card includes obscuring, in the captured image, the second group of information and storing an obscured version of the image of the first group of information; and
wherein:
the second group of information includes a security code and an expiration date.

10. A smart glasses device for initiating a transaction between a first smart card and a second smart card, the smart glasses device comprising:
a display operable to display a first augmented reality display;
a camera operable to:
capture a motion associated with a selection to initiate a transaction in the first augmented reality display;
detect the first smart card and the second smart card within a field of view ("FOV") of the smart glasses device; and
capture an image of the detected first smart card and an image of the detected second smart card;
a microprocessor operable to extract first identification data from the first smart card and second identification data from the second smart card;
a light fidelity ("Lifi") receptor operable to retrieve:
a first erasable programmable read-only memory ("EPROM") array pattern embedded in an EPROM on the first smart card, the first EPROM array pattern transmitted to the smart glasses device by a Lifi emitter included on the first smart card; and
a second EPROM array pattern embedded in an EPROM on the second smart card, the second EPROM array pattern transmitted to the smart glasses device by a Lifi emitter included on the second smart card;
the microprocessor operable to:
verify the first identification data and the first EPROM array pattern by:
establishing a connection with a payment processing network identified by a routing number on the first smart card;
transmitting to the payment processing network a data packet including the first identification data and the first EPROM array pattern; and
receiving, from the payment processing network, a confirmation message confirming a veracity of the first identification data included in the data packet;
verify the second identification data and the second EPROM array pattern by:
establishing a connection with a payment processing network identified by a routing number on the second smart card;
transmitting to the payment processing network a data packet including the second identification data and the second EPROM array pattern; and
receiving, from the payment processing network, a confirmation message confirming a veracity of the second identification data included in the data packet;
the display operable to trigger a second augmented reality display, the second augmented reality display including a first selectable image of the first smart card, a second selectable image of the second smart card, and a fillable field;
the camera operable to capture a series of motions that, within a second augmented reality, correspond to:
a numerical value inputted in the fillable field;
a selection of the second selectable image of the second smart card; and a movement dragging the selected second selectable image from a first location to a second location positioned on top of the first selectable image of the first smart card;

the microprocessor operable to, in response to a positioning of the second selectable image of the second smart card on top of the first selectable image of the first smart card, the initiating the transaction includes transmitting an instruction to the payment processing network to transfer a value of funds equal to the numerical value inputted in the fillable field from the first smart card to the second smart card, the instruction further comprising data identifying the first smart card and data identifying the second smart card; and a battery, said battery operable to power the camera, the microprocessor and the display.

11. The smart glasses device of claim 10 wherein the first identification data comprises a first card account number, a name of a first cardholder and a first originating entity associated with the first smart card.

12. The smart glasses device of claim 11 wherein the second identification data comprises a second card account number, a name of a second cardholder and a second originating entity associated with the second smart card.

13. The smart glasses device of claim 12 wherein the smart glasses device comprises an embedded subscriber identify module ("E-SIM"), the E-SIM for electronically communicating with the first originating entity and the second originating entity.

14. The smart glasses device of claim 13 wherein the first EPROM array pattern and the second EPROM array pattern are dynamic patterns, and the smart glasses device is configured to receive, via the E-SIM, at pre-determined frequent intervals, an updated first EPROM array pattern and an updated second EPROM array pattern.

15. The smart glasses device of claim 10 wherein the selection for initiating the transaction is selected by a smart glasses user on a mobile device application of a mobile device associated with the smart glasses user and in response to the selection, transmitting a communication from the mobile device to the smart glasses to initiate the transaction.

16. A method for using smart glasses for providing an identity transfer between a first smart card and a second smart card, the method comprising:

using the smart glasses to display a first augmented reality display;

capturing, using a smart glasses camera, a motion associated with a selection to initiate the identity transfer in the first augmented reality display;

detecting, using the smart glasses camera, the first smart card and the second smart card within a field of view ("FOV") of the smart glasses;

capturing, using the smart glasses camera, an image of the detected first smart card and an image of the detected second smart card;

extracting, using a microprocessor, first identification data from the first smart card and second identification data from the second smart card;

retrieving, by a smart glasses light fidelity ("Lifi") receptor:

a first erasable programmable read-only memory ("EPROM") array pattern embedded in an EPROM on the first smart card, the first EPROM array pattern transmitted to the smart glasses by a Lifi emitter included on the first smart card; and a second EPROM array pattern embedded in an EPROM on the second smart card, the second EPROM array pattern transmitted to the smart glasses by a Lifi emitter included on the second smart card;

verifying the first identification data and the first EPROM array pattern by:

establishing a connection with a payment processing network identified by a routing number on the first smart card;

transmitting to the payment processing network a data packet including the first identification data and the first EPROM array pattern; and receiving, from the payment processing network, a confirmation message confirming a veracity of the first identification data included in the data packet;

verifying the second identification data and the second EPROM array pattern by:

establishing a connection with a payment processing network identified by a routing number on the second smart card;

transmitting to the payment processing network a data packet including the second identification data and the second EPROM array pattern; and receiving, from the payment processing network, a confirmation message confirming the veracity of the second identification data included in the data packet;

triggering a second augmented reality display, the second augmented reality display including a first selectable image of the first smart card, a second selectable image of the second smart card, and a fillable field;

capturing, using the smart glasses camera, a series of motions that, within a second augmented reality, correspond to:

a selection of the second selectable image of the second smart card; and a movement dragging the selected second selectable image from a first location to a second location positioned on top of the first selectable image of the first smart card; and in response to a positioning of the second selectable image of the second smart card on top of the first selectable image of the first smart card, overwriting by the microprocessor, temporarily, second identification data at the second smart card with first identification data, the overwriting including:

transmitting an instruction to the payment processing network to temporarily overwrite, in real-time, second identification data at the second smart card with first identification data; and scheduling a reset date to the second smart card on which to delete first identification data and reset the second smart card with second identification data.

17. The method of claim 16 wherein the reset date is a pre-determined date and time for resetting the second smart card to execute transactions using a default identification, the default identification being the second identification data.

18. The method of claim 17 wherein the instruction further includes tagging to the second smart card a maximum value of funds available for use up until the reset date.

19. The method of claim 16 wherein the overwriting further comprises overwriting the second EPROM array pattern with the first EPROM array pattern.

20. The method of claim 16 further comprising following the overwriting, transmitting an alert message confirming the overwriting to a mobile device of a second user, the second user being a cardholder of the second smart card.

* * * * *